United States Patent [19]

Walker

[11] Patent Number: 5,091,840

[45] Date of Patent: Feb. 25, 1992

[54] POWER CONVERSION SCHEME EMPLOYING SHORTING MEANS TO CONTROL CURRENT MAGNITUDE

[75] Inventor: Loren H. Walker, Salem, Va.

[73] Assignee: General Electric Company, Salem, Va.

[21] Appl. No.: 567,021

[22] Filed: Aug. 14, 1990

[51] Int. Cl.$^5$ ............................................ H02M 7/521
[52] U.S. Cl. ........................................ 363/96; 363/137
[58] Field of Search .................... 363/95, 96, 98, 132, 363/137, 138

[56] References Cited

U.S. PATENT DOCUMENTS

| | | | |
|---|---|---|---|
| 4,188,663 | 2/1980 | Okawa et al. | 363/96 |
| 4,384,248 | 5/1983 | Matsuda et al. | 363/58 |
| 4,567,420 | 1/1986 | Beck | 363/138 |
| 4,581,693 | 4/1986 | Ueda et al. | 363/96 |
| 4,720,776 | 1/1988 | Guyeska et al. | 363/138 |
| 4,730,242 | 3/1988 | Divan | 363/132 |
| 4,757,435 | 7/1988 | Wood et al. | 363/54 |
| 4,965,709 | 10/1990 | Ngo | 363/137 |

*Primary Examiner*—Jeffrey Sterrett
*Attorney, Agent, or Firm*—Arnold E. Renner

[57] ABSTRACT

A power conversion scheme for transferring power between a DC current source and an AC voltage source employs a polyphase bridge and a thyristor to short circuit the DC current source to interrupt AC current. Comutation of the thyristor is achieved by scheduling firing switch devices of the bridge as a function of phase voltages of the AC voltage source.

9 Claims, 5 Drawing Sheets

POWER CONVERSION SCHEME EMPLOYING SHORTING MEANS TO CONTROL CURRENT MAGNITUDE

BACKGROUND OF THE INVENTION

This invention was made with Government support under Prime Contract DNA001-88-C-0028 awarded by the Department of Defense. The Government has certain rights in this invention.

The present invention relates generally to power conversion schemes and more particularly to a scheme for facilitating the transfer of electrical power between a direct current (DC) current source and an alternating current (AC) voltage source. Still more particularly, the present invention relates to the control of the AC current and hence the electrical power of such a scheme.

There are numerous instances in which it is desired to transfer electrical power bi-directionally between a DC current source and an AC voltage source. (As used herein, the terms DC current source and AC voltage source are used in their pure sense; that is, either can be a source or a sink of electric power.) Examples include electric power peaking stations where an AC utility line is connected to a peaking sink, such as a superconducting magnet energy storage system, so that in times of excess, energy may be stored in the sink to be later utilized when demand increases. Other examples include motor drives in which, for example, an AC motor with regeneration capabilities is operated with respect to a DC current source such as a highly inductive rectification system and an arrangement for passing power from one AC source to another utilizing an intermediate DC link, commonly referred to as an HVDC system.

In power conversion schemes of the type here under consideration, it is generally desirable to be able to match the fundamental frequency of the converter to that of the AC voltage source and to control the value of the AC current to thus control the power transfer between the two sources. The typical converter in use today employs some form of static switch device in a polyphase bridge arrangement for effecting control of the frequency and the current magnitude. Where increased flexibility is desired, these switch devices are often gate turn-off thyristors (GTO) or power transistors. Such devices permit easy turn-on and turn-off capability such that the current delivered to the AC voltage source can be controlled independently as to magnitude and phase.

One form of current magnitude control is by what is commonly referred to as "notching". With a constant current source, the basic output of the bridge is a square wave. By placing a notch (i.e. turning the current off for a period) within the square wave output, the effective current is varied as a function of the width of the notch. In other words, the longer the time period of the notch the smaller the effective current.

With controllable turn-on, turn-off devices (e.g. GTOs and power transistors), notching at lower power levels is relatively simple. In a three phase bridge having six legs, one normally "fires" (renders conductive) a diametrically opposite pair of devices to short circuit the DC current source to begin the notch period. After the desired length of time, the bridge is returned to the original conductive state to finish the square wave current pulse at the fundamental frequency.

At higher power levels, the duty cycle occasioned by the switching of the devices becomes very severe and the increased duty cycle can cause serious additional expense by virtue of the fact that such devices are relatively expensive and, generally, the greater the capability, the higher the cost. A much less expensive device, particularly at higher power levels, is the ordinary thyristor. This device is turned on by application of a gating signal, in conjunction with a forward voltage, and is turned off by reducing the current therethrough to essentially zero value. The use of the ordinary thyristor to affect a short circuit of the DC current source results in a reduced duty cycle of associated turn-on, turn-off switch devices. In addition, the use of a thyristor substantially reduces the overall losses in the converter. This is because an ordinary thyristor has a lower forward voltage drop than a GTO and because the short circuit can be achieved using a single device as opposed to the requirement of using a pair of devices when diametrically opposite GTOs are employed.

SUMMARY OF THE INVENTION

It is, therefore, an object of the present invention to provide an improved power conversion scheme for transferring electrical power between a DC current source and an AC voltage source.

It is a further object to provide an improved power conversion scheme, for the bi-directional transfer of electrical power between a DC current source and an AC voltage source, employing a notching technique.

It is another object to provide an improved power conversion scheme employing turn-on, turn-off switch devices in a polyphase bridge arrangement to control the fundamental frequency of power transferred and a thyristor operable to short circuit a DC current source on a selective basis to provide a notch of variable duration to thus vary the effective value of the current and thus the power transferred.

The foregoing and other objects are achieved, in accordance with the present invention, by providing a power conversion scheme which selectively transfers electrical power between a DC current source and an AC voltage source utilizing a plurality of switch devices arranged in a polyphase bridge circuit having AC and DC terminals. Each of the switch devices is selectively rendered conducting and non-conducting in response to applied gating signals. DC and AC buses connect the two sources to the bridge circuit and there is further included a thyristor which is connected across the DC bus which thyristor acts, when conducting, to short circuit the DC source to provide a discontinuity or notch in the AC current to vary the effective value thereof. This use of the thyristor relieves the switch devices of the bridge circuit of that part of the duty cycle which would attend the use of the devices to short the DC current source. The thyristor is rendered conductive by the application of a gating signal and rendered non-conductive, in a conventional matter, by the reduction of its current to a substantially zero value. A suitable control means selectively provides gating signals to the switch devices and to the thyristor. Switching of the devices is at a fundamental frequency corresponding to the frequency of the AC source while the thyristor is activated to selectively short circuit the DC current source. The control furnishes additional signals to the switch devices to selectively render them conducting as a function of the phase voltages of the AC voltage source to render those devices conducting and thus render the thyristor non-conducting. By varying the time period over which the thyristor is conducting, and hence the time during which the DC source is short circuited, the effective value of the current (and the value of the electric power transferred) between the two sources is varied.

BRIEF DESCRIPTION OF THE DRAWING

While the present invention is defined in particularity in the claims annexed to and forming a part of this specification, a better understanding thereof can be had by reference to the following specification taken in conjunction with the accompanying drawing in which:

FIG. 1 is a block schematic diagram illustrating a circuitry for implementing the present in its preferred embodiment;

DETAILED DESCRIPTION

Figures 1, 6:
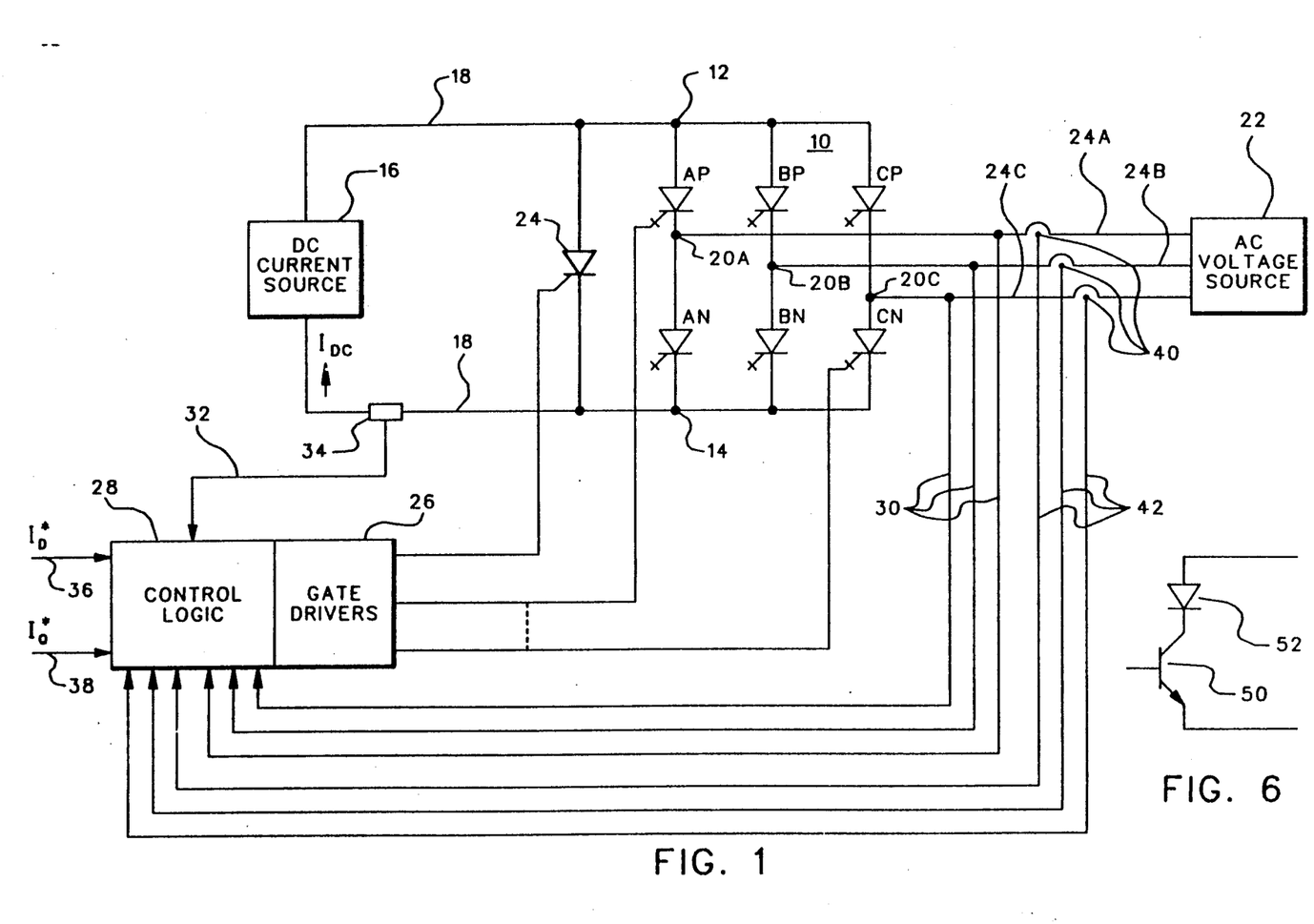

Referring now to FIG. 1, ther is shown generally at 10, a three-phase bridge comprised of six switch devices respectively designated AP, BP, CP and AN, BN, CN. The P and N designations generally denote "positive" and "negative" sides of the bridge. As illustrated, each of the six switch devices is a gate turn-off thyristor (GTO) which designation will generally be used for convenience in this specification. It is, however, to be expressly understood that other forms fo devices can be used with equal facility, as will be further brougth out with respet to FIG. 6.

Bridge 10 has a pair of DC terminals 12 and 14 to which is connected a DC current source 16 by means of suitable bus 18. The DC current source 16 may be of any appropriate type, as examples, a super conducting magnet enrgy storage means or a rectifier bridge with a large series inductor. The important feature to be stressed here is that it is a DC current source. Bridge 10 also includes AC terminals 20A, 20B and 20C respectively at the junction of the each pair of switch devices. These terminals are connected to an AC voltage source 22 by way of an AC bus having individual lines 24A, 24B and 24C corresponding, respectively, to the A, B, and C phases of the system. The AC voltage source may be, for example, utility power lines.

A thyristor 24 is connected across the DC bus, between terminals 12 and 14, for shorting the DC current source. Thyristor 24 and each of the GTOs of bridge 10 receive suitable gating signals from gate drivers 26. In the case of thyristor 24, ony a turn-on signal is provided. In the case of the bridge GTOs, both turn-on and turn-off signals are provided. (In FIG. 1, for sake of simplicity, only two of the GTO gate connections have been illustrated.)

Gate drivers 26 are under the control of suitable control logic 28 which receives input signals, via lines 30, representing the three phase voltages of the AC voltage source. Logic 28 also receives signals (derived by appropriate means such as current transformers 40) representing the three AC phase currents via lines 42 and a signal proportional to the DC current IDC) by way of a line 32. The DC current is sensed by a suitable means 34 such as a series connected resistor.

The magnitude and phase relationships of AC voltages can be determined from the signals on lines 30. The DC current signal on line 32 represents the magnitude of the DC source current while the signals on lines 40 represent the magnitude and phase of the AC bridge currents.

Control logic 28 may be of any appropriate configuration and type (analog or digital) known in the art. This logic acts in response to the voltage and current signals just described and to two additional signals to control, through the gate drivers 26, the conductive states of the GTOs and the thyristor 24. The two additional signals are applied to the control logic via lines 36 and 38 and are, respectively, command signals representing the levels of real current ($I_D$*) and reactive current ($I_Q$*) desired to be provided on the AC bus 24A, 24B and 24C. (In this specification, the addition of an asterisk (*) to a signal designation indicates a commanded value of that quantity.)

Based upon its inputs, control logic 28 determines the conduction times of the bridge GTOs and thyristor 24. This control involves the employment of two angles—alpha ($\alpha$) and beta ($\beta$)—as are demonstrated in FIG. 2. Referencing now that figure, the top trace shows the phase A and phase C line-to-neutral voltages (A-N and C-N) and the A-C line-to-line voltage. These representations establish a time reference. The second trace, $\phi A$ ($\alpha = 0°$), shows the phase A current of a conventional three-phase bridge, without a shorting period or notching, gated for unity power factor current. As such, the $\phi A$ waveform is centered on the A-N voltage waveform, is "on" for 120 electrical degrees, and starts at the zero crossing of the A-C line-to-line voltage waveform. This position of gating the GTOs is defined as the zero value of the $\alpha$ angle ($\alpha$ TM 0°). The third trace of FIG. 2, $\phi A$ (delayed), shows a current waveshape generated by delaying the gating of the bridge GTOs by an angle $\alpha$ (shown as approximately 30°). Thus, in accordance with the present description the angle $\alpha$ is defined as the angle between the zero crossing of a line-to-line voltage and the beginning of a conduction period for a corresponding bridge phase current. In the present example this last mentioned current would be initiated by gating on GTO AP (FIG. 1).

Figure 2:
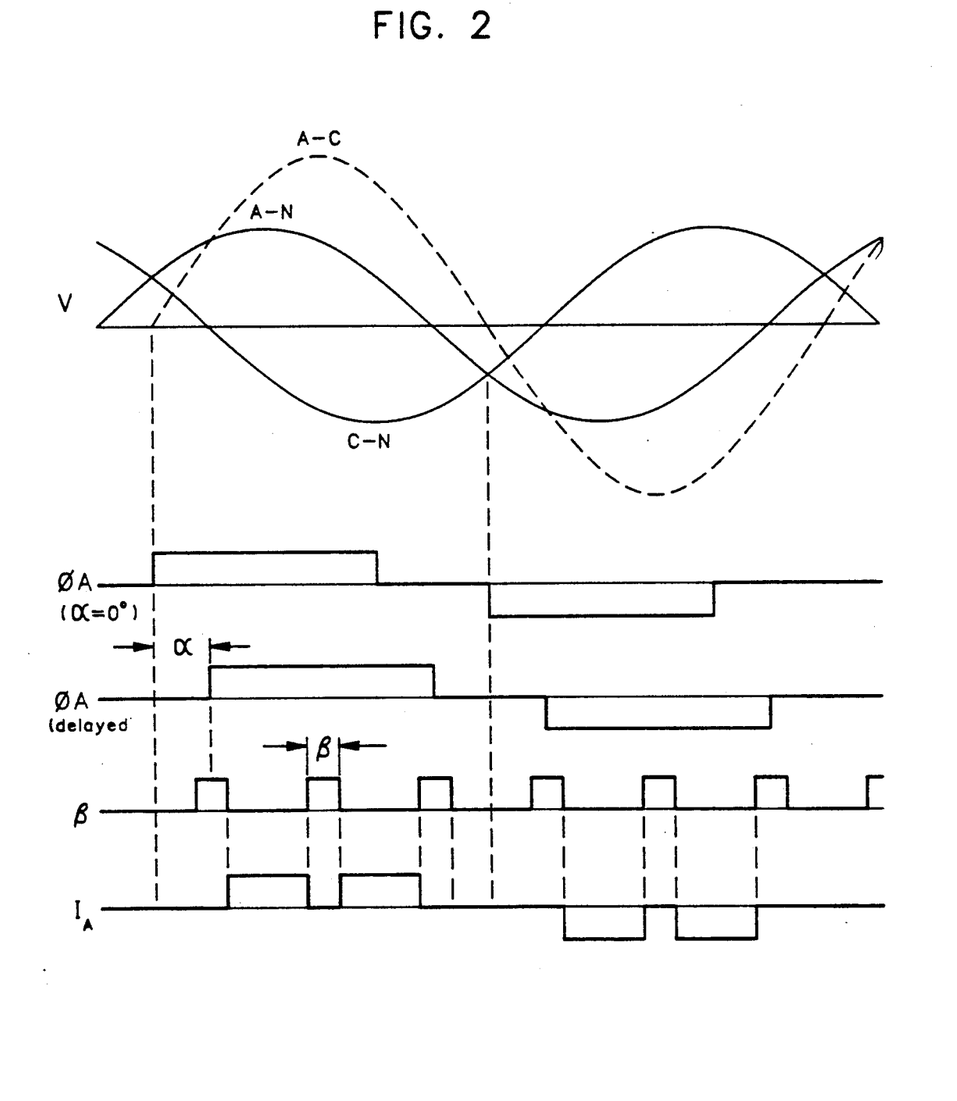
FIGS. 2 through 5 are each a series of waveforms useful in understanding the present invention; and, FIG. 6 is a schematic diagram illustrating an equivalency of use in accordance with the present invention.

Since the trace $\phi A$ ($\alpha = 0°$) represents unity power factor (fundamental) operation, the angle $\alpha$ can also be defined as the power factor angle for displacement power factor. That is:

Power factor = cos $\alpha$

For GTOs, the value of $\alpha$ is unrestricted since these devices may be turned off at any time. Since $\alpha$ may be of any value, the power factor may be varied between +1.0 and −1.0. Positive power factor represents power flow from the DC source to the AC source. Negative power factor represents power flow from the AC source to the DC source. Power factors between +1 and −1 represent a proportional amount of reactive current following the conventional definition of power factor.

The angle beta ($\beta$) defines the width of the shorting periods (or notches in the output currents) which, in the present example, occur six times per cycle. The fourth trace (labeled $\beta$) of FIG. 2 shows the location of these shorting periods with respect to the phase current waveform. The fifth trace of FIG. 2 illustrates the effect of these pulses on a phase current. The $\beta$ pulses and their effects will be discussed in greater detail with respect to FIGS. 3, 4 and 5. The transfer function of the FIG. 1 system, as a ratio of maximum current magnitude, is essentially linear. If:

$I_{DC}$ = Current magnitude of DC source, $I_f$ = Magnitude of the fundamental component of AC current in source 22, $I_f^*$ = command value of $I_f$, i.e., $I_f^* = \sqrt{(I_D^*)^2 + (I_Q^*)^2}$ , and $I_{fm}$ = Maximum AC current magnitude for a given $I_{DC}$ (i.e. $\beta = 0$), then (for a three phase bridge) the following relationships describe the operation of the FIG. 1 circuit.

$$I_{fm} = I_{DC}(0.78) \quad (1)$$

$$I_f = I_{fm}\left(\frac{60° - \beta}{60°}\right) \quad (2)$$

$$I_D = I_f \cos \alpha \quad (3)$$
$$I_Q = I_f \sin \alpha \quad (4)$$

control logic 28 (FIG. 1) serves to control the operation of the FIG. 1 circuit in accordance with the functions:

$$\alpha = \arctan I_Q^*/I_D^* \quad (5)$$

$$\beta = 60°\left(\frac{I_{fm} - I_f^*}{I_{fm}}\right) \quad (6)$$

If operation of the circuit is such that thyristor 24 will naturally commutate, then the gating times are controlled by relationships (5) and (6) above. If operation thyristor will not naturally commutate then the gating times are transiently modified to provide the requisite "safety angle" for commutation as hereinafter discussed. As is well-known, the safety angle required for commutation of a thyristor is the function of the thyristor itself and various circuit parameters including the current to be commutated, certain circuit voltages and the inductance of the line. A more complete description of the safety angle may be had by reference to the book *Rectifier Circuits: Theory and Design* by Johannes Schaefer, (John Wiley & Sons Inc., 1965 Library of Congress Catalog Card Number: 65-12703), particularly to pages 185 to 190 thereof, which work is specifically incorporated by reference hereinto.

Figure 3:
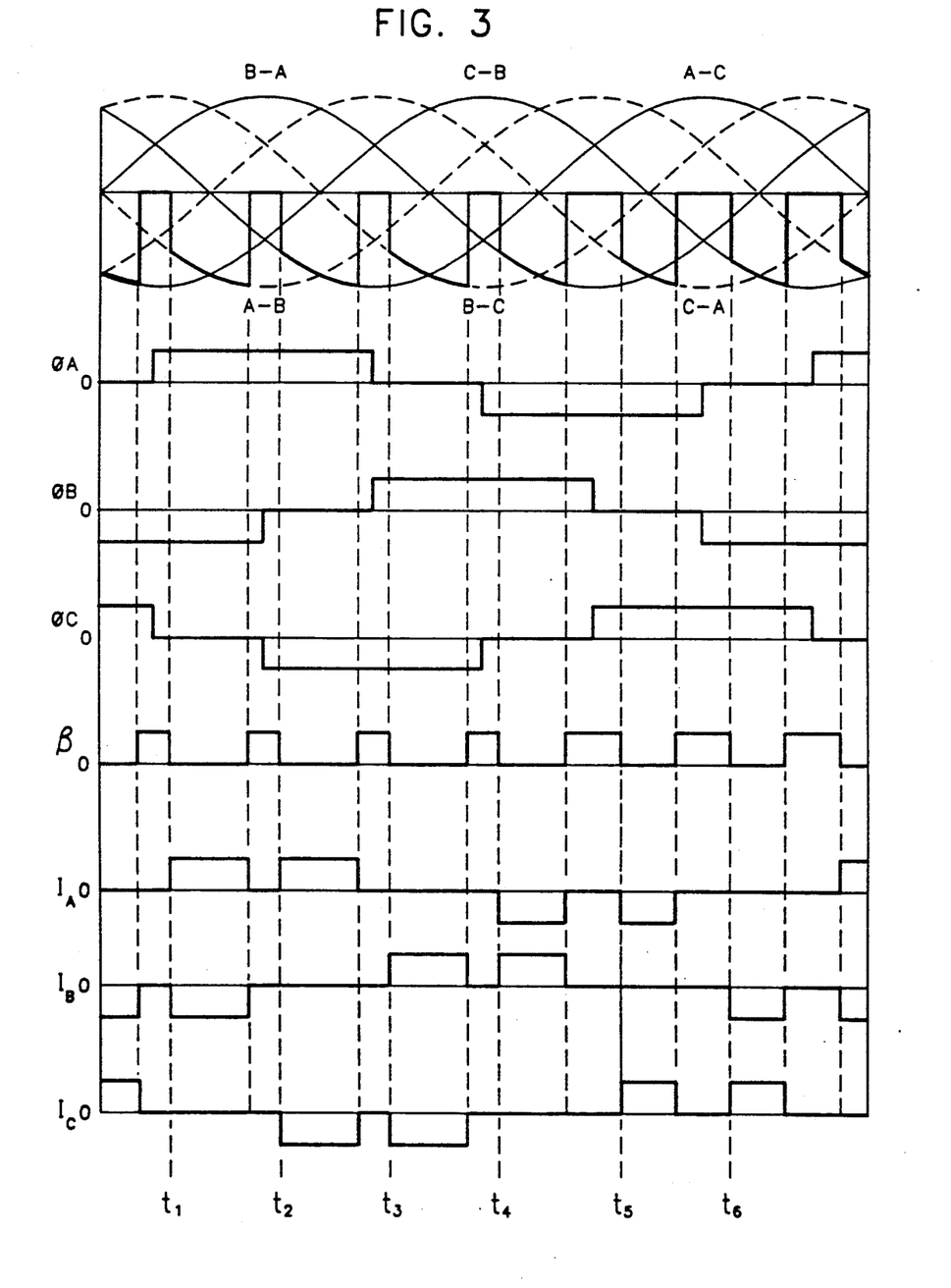
Figure 4:
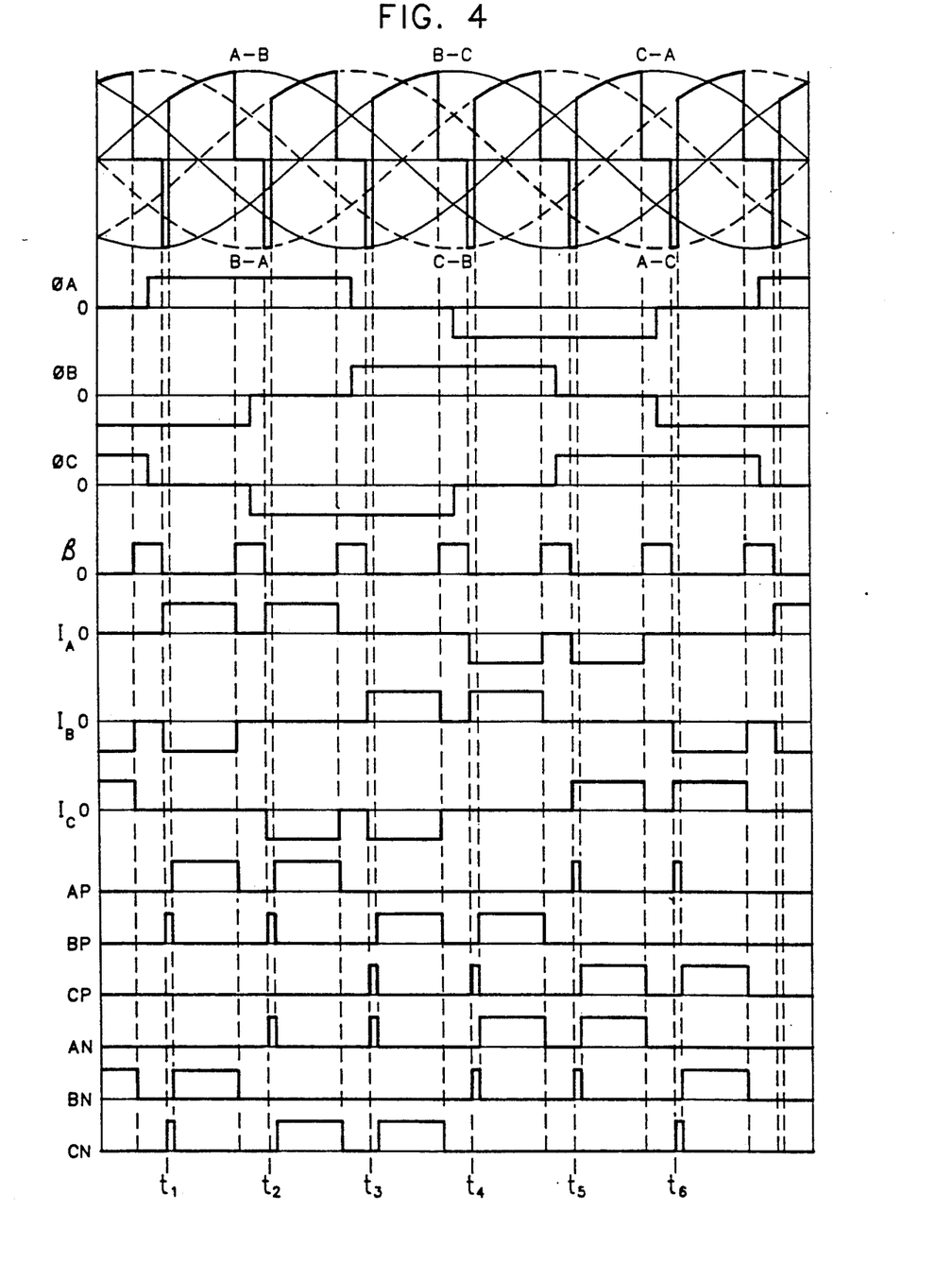
Figure 5:
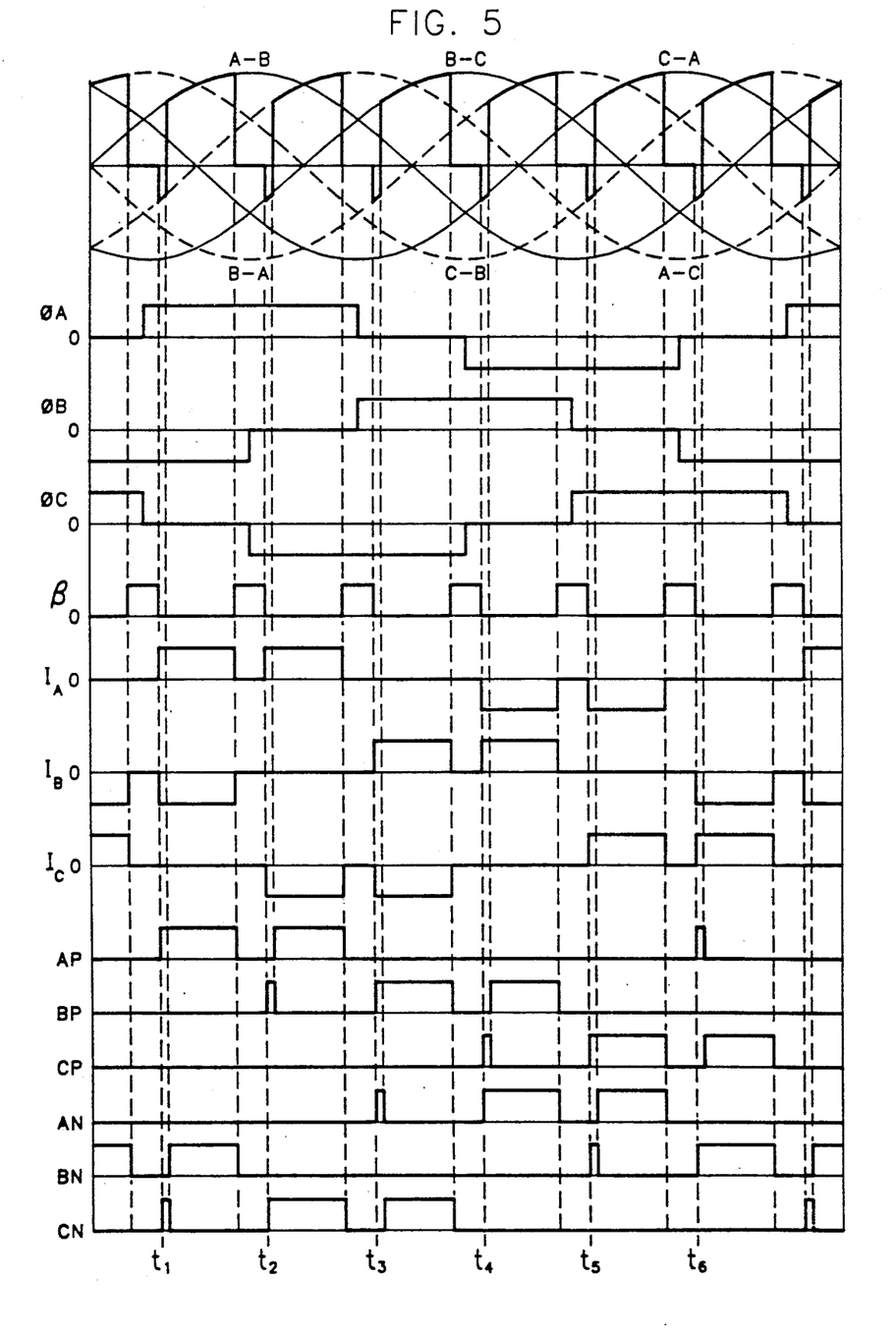

The operation of the power conversion scheme in accordance with the present invention is best understood with respect to FIGS. 3, 4 and 5. Before specifically examining those figures, however, it is believed advantageous to establish some basic principles. As is well understood in the power conversion discipline, the fundamental firing philosophy of a three phase system is to have each of the phases conductive during successive periods of 120 electrical degrees. Such a firing scheme represents the maximum available power transfer through the bridge. Lesser current and power levels can be achieved by utilizing less than 120 degrees as is known. The bridge typically has a basic firing sequence which, with reference to FIG. 1, is described by the following table of switch device pairs:

AP - BN
AP - CN
BP - CN
BP - AN
CP - AN
CP - BN

Each GTO pair is capable of being conductive at successive intervals of 60 electrical degrees.

It is further known in the art that, with a constant DC current source, the effective bridge current, and hence the power transferred, can be varied by varying the length of time, within the 120 degree period, during which current is present. One method of varying this current is by what is commonly referred to as "notching". One way of achieving notching is by short circuiting the DC current source, as earlier indicated. Also, as earlier indicated, this notching is achieved according to the present invention by selectively rendering the thyristor 24 conducting and non-conducting.

Reference is now made to FIG. 3 which illustrates a basic operation of the present invention in one of its more fundamental aspects. The upper trace includes six sinusoidal wave shapes which represent the phase (line-to-line) voltages as seen at the AC terminals 20A, 20B and 20C of bridge 10 as well as the inverse of these voltages. The three traces $\phi A$, $\phi B$, and $\phi C$ represent the theoretical currents, from DC source 16, passed to the three terminals 20A, 20B and 20C of the bridge with 120 degrees conduction. FIG. 3 represents a case in which power is transferred from the AC voltage source to the DC current source. In this situation the current $I_{DC}$ is in the direction indicated in FIG. 1 and there exists a negative average voltage across the thyristor and the DC current source.

The next trace, labeled $\beta$, represents the notching pulses in accordance with the present invention. As illustrated (although not a requirement), the $\beta$ pulses are centered at the normal switching points of the GTO bridge. Thus, the $\beta$ pulses are centered on the rising and falling edges of the theoretical current waveforms $\phi A$, $\phi B$ and $\phi C$. Since there are six such edges, there are six such $\beta$ pulses located 60 electrical degrees apart. (While the $\beta$ pulses are shown "centered", this is not a requirement, the important factor being that the pulses "surround"—begin before and end after—the edges of the thyristor and hence the time the DC current source is short circuited. As will be recognized, the length of the $\beta$ pulses will determine the effective current and hence the effective power transferred. In this regard, attention is drawn to the first four $\beta$ pulses (from the left) which are approximately 15 electrical degrees in duration and the last three which are approximately twice that size, 30 electrical degrees. It is to be understood that the duration of these $\beta$ pulses (and thus the notch width), within limits including turn-on and turn-off times and the effective length of the conduction periods, is arbitrary and represents the parameter which controls the AC current magnitude.

The effect of short circuiting the DC current source, that is, the effect of the $\beta$ pulses upon the various phase currents, is illustrated by the last three traces of FIG. 3. These traces, labeled respectively $I_A$, $I_B$ and $I_C$, depict the notches within the various phase currents. It is readily obvious that the effective magnitude of the current will be varied as a function of the notch width and this is demonstrated by a comparison of the phase currents with a $\beta$ pulse angle of 15 degrees and a $\beta$ angle of 30 degrees. The description thus far of the FIG. 3 is essentially that which is well known.

The use of the thyristor in conjunction with the switch devices of the GTO nature, taken in conjunction with the scheme for rendering that thyristor non-conducting, is central to the present invention. The thyristor is rendered non-conducting as a function of the extant values of the several phase voltages of the AC voltage source by the rendering conductive an appropriate pair of GTOs within the bridge 10. Preferably, the pair of GTOs to be rendered conductive to turn the thyristor 24 off would be the pair next scheduled to be conducting. This requires, however, that the line-to-line voltage associated with that pair of GTO devices is negative and there an adequate safety angle, with respect to the firing of that pair, to effect commutation of the thyristor.

Referencing once again FIG. 3, at time $t_1$, the end of the first $\beta$ pulse, it is seen that the A-B line-to-line voltage is negative. That is, terminal 20A (FIG. 1) is negative with respect to terminal 20B. Thus, the requisite negative voltage is present and in this preferred situation, a sufficient safety angle exists for commutation. As such, at time $t_1$ the thyristor is commutated by rendering conducting GTOs BN and AP. The other times, $t_2$-$t_6$, demonstrate commutation with regard to the other phases. The voltage across the thyristor is indicated by the heavy line shown in the upper trace of FIG. 3. This is simplest and most desirable case of thyristor commutation.

As earlier indicated, if the line-to-line voltage of the next scheduled to be fired GTO pair is not negative, or if there is an insufficient safety angle, then an alternative firing scheme must be achieved. Pursuant to the present invention, this alternative scheme provides that a different pair of GTOs is initially selected to be turned on. Once commutation of the thyristor has been achieved, the initially selected pair is turned off and the next scheduled pair is fired in accordance with the predetermined schedule. One way of achieving this alternative scheme is to select any pair of GTOs which has an associated negative line-to-line voltage and sufficient safety angle, to fire that pair momentarily (long enough to commutate the thyristor), and then to switch that pair off while switching on the originally scheduled next pair. One example of such a pair of GTOs to first select, perhaps the most obvious, is that pair associated with the most negative line-to-line voltage. FIG. 4 illustrates the wave shapes associated with this mode of operation utilizing the pair with the most negative voltage.

The first seven traces of FIG. 4 are substantially identical to the depiction of FIG. 3 with the following two exceptions. First of all the direction of power flow has been reversed and thus the average voltage across the DC source and the thyristor is of positive polarity. The current in the AC voltage source has been shifted 180° in time phase with respect to the voltage to implement a reversal in power flow direction. This 180° shift is shown in line-to-line voltage depictions of the top trace. This inversion of operation mode emphasizes the requirement of a negative, line-to-line voltage with respect to the next to be fired pair of GTOs. The second difference is that this figure has been simplified by making all of the $\beta$ pulses of the same duration, approximately 15 electrical degrees. As before, the heavy line depiction of the first trace represents the thyristor voltage.

first at time $t_1$, the end of the first $\beta$ or notching

Looking pulse, in accordance with the present example the AP and BN GTOs are scheduled to be fired. It is evident from FIG. 4, however, that the A-B line-to-line voltage is not negative and hence the decision is made to fire that pair of GTOs associated with the most negative line-to-line voltage. In this case this results in the firing of the BP and CN GTOs. These GTOs are fired for a very short period of time as is indicated by the two small pulses associated with the respective traces starting at time $t_1$. As shown by the first trace, this firing results in a negative thyristor voltage to thus commutate that thyristor. Subsequently, the AP and BN GTOs (the scheduled pair) can be fired to render them conductive. Similar analyses can be made for the GTOs at the time of each of the $\beta$ pulses. The depictions of FIG. 4 are believed, however, to render further detailed explanation unnecessary. It is well to state, however, that the firing pulses for the commutating GTOs are greatly exaggerated in duration for purposes of illustration. The actual pulses required are very short and thus the affect on the currents would negligible.

While the method represented by FIG. 4 performs very well in assuring thyristor commutation, it has the serious disadvantage of resulting in a significant increase in the rendering of conductive and non-conductive of the GTOs of the bridge. This increases their duty cycles and results in greater losses. As such, the preferred form of the present invention uses an intermediate mode of operation which is demonstrated in FIG. 5. This intermediate mode is readily achieved by virtue of the fact that logic such as may be available in the block 28 (FIG. 1) in the form of microprocessors and other data processing apparatus is extremely versatile and relatively inexpensive. Thus, the options available to the operational circuit as a whole are extremely varied.

The option illustrated by FIG. 5 is one which provides an intermediate mode between the two schemes described with respect to FIGS. 3 and 4. This intermediate mode provides that if the option described with respect to the option FIG. 3 (i.e., the scheduled to be gated pair provides negative thyristor voltage) is not available, the logic next determines if there exists a pair of GTOs with sufficient negative voltage and safety angle to commutate the thyristor, one of which GTOs is next scheduled to be rendered conducting. FIG. 5 demonstrates this intermediate mode in a one-to-one correlation with FIG. 4. At $t_1$ time, when once again the AP and BN GTOs are scheduled to be fired, the voltage is not negative. The firing of these two GTOs is thus not an viable option. However, as illustrated at time $t_1$, the AP and CN combination does have sufficient negative voltage and has sufficient safety angle to effect commutation. As such, at time $t_1$ (the end of the first $\beta$ pulse) the AP and CN GTOs are fired to extinguish thyristor 24. As soon as that commutation is accomplished, the CN GTO is turned off and the BN GTO rendered conductive, thus establishing conduction in the scheduled pair. Similar analyses can be made for each of the 60 degree intervals. For example, at time $t_2$, when the second $\beta$ pulse is terminated and the next scheduled pair of GTOs to be fired is AP and CN, the initial conduction is by the pair BP and CN with subsequent transfer to the scheduled pair AP and CN. The advantage of this intermediate mode of operation is that significantly fewer (as many as one-half) extra switchings of the GTOs are required as compared to the mode represented by FIG. 4. (This is evident by a comparison of the six waveforms, AP to CN, in FIGS. 4 and 5.) A reduction in the number of switchings results in a reduction of losses in the GTOs and the system as a whole.

Thus, in accordance with the present invention, the notching to vary the current between the DC current source and the AC voltage source is accomplished by providing a thyristor which is rendered conducting to short circuit the DC current source. The commutation scheme for that thyristor is based upon a logic algorithm dependent upon the extant value of the line-to-line voltages of the AC source. This algorithm comprises, in its preferred embodiment, the steps of first determining if a sufficient negative line-to-line voltage exists associated with the pair GTOs next scheduled to be fired, and if so, to render that pair conductive. If that situation does not exist, the algorithm proceeds to the next step of determining whether there exists a negative line-to-line voltage associated with a pair of GTOs, one of which is next scheduled to be rendered conductive, and to use that pair if the associated safety angle is sufficient to effect commutation. The third alternative, in accordance with the full extent of the invention, is that if neither the previous options exists, a pair with a negative line-to-line voltage and sufficient safety angle is determined and that GTO pair is rendered conductive for a length of time sufficient to commutate off the thyristor. In the latter two situations, after the short circuit thyristor has been turned off, conduction is switched to the originally scheduled pair of GTOs.

While the previous description has employed GTOs as the switch device example, following the most prevalent case with today's technology, other devices are available. FIG. 6 illustrates the use of a transistor 40 and a series connected diode. This combination can replace the GTOs AP thru CN as is well known. Similarly, the depiction of FIG. 1 is recognized to be one which employs symmetrical GTOs. If asymmetrical GTOs were employed, a series connected diode similar to that illustrated in FIG. 6 might be required. It is, of course, possible that other types of switch devices may be employed without deviating from the principles of the invention.

While the foregoing has illustrated the present invention in its preferred embodiment, modifications thereto will readily occur to those skilled in the art. Some of the possible variations and modifications have been earlier discussed. Of particular import is the earlier mentioned feature relative to the placement of the β pulses. While location at the current switching times is the most advantageous place for the basic system illustrated since that results in the least number of operations of the switch devices, the β pulses can be, within the commutation limits discussed, located arbitrarily with the 120 electrical degree conduction periods. In some applications it may be desirable to so relocate these β pulses. It is not desired, therefore, that the present invention be limited to this specific embodiments shown and described and it is intended, in the appended claims, to cover all such modifications as fall within the true spirit and scope of the invention.

What is claimed is:

1. A power conversion scheme for selectively transferring electric power between a DC current source and an AC voltage source comprising:
   a) plural switch devices arranged in a polyphase bridge circuit having DC terminals and AC terminals, each of said switch devices adapted to be selectively rendered conducting and non-conducting in response to applied gating signals;
   b) a DC bus connecting said DC current source to said DC terminals;
   c) an AC bus connecting said AC voltage source to said AC terminals;
   d) thyristor means connected across said DC bus, said thyristor means acting, when conducting, to short circuit said DC current source, said thyristor means being rendered conducting by the application thereto of a gating signal and being rendered non-conducting by the reduction of current therethrough to substantially zero value;
   e) control means for selectively furnishing gating signals:
      1) to said switch devices in a prescribed sequence thereby rendering said devices selectively conducting to establish an electrical current to thus transfer electrical power between sd DC current source and said AC voltage source, said electrical current being at a fundamental frequency corresponding to the frequency of said AC voltage source;
      2) to said thyristor means to render said thyristor means conducting and hence short circuit said DC current source; and,
      3) to said switch devices to render said devices selectively conducting as a function of extant values of the several phase voltages of said AC voltage source to render said thyristor means non-conducting and thus establish a conduction period for said thyristor means;
      4) said control said gating signals being furnished to then conducting switch devices to render such devices non-conducting at substantially the same time as the gating signals are furnished to said thyristor means to render said thyristor conducting;
   f) whereby the effective magnitude of the current between said DC current source and said AC voltage is varied as a function of the conducting period of said thyristor means.

2. A power conversion scheme for selectively transferring electric power between a DC current source and an AC voltage source comprising:
   a) plural switch devices arranged in a polyphase bridge circuit having DC terminals and AC terminals, each of said switch devices adapted to be selectively rendered conducting and non-conducting in response to applied gating signals;
   b) a DC bus connecting said DC current source to said DC terminals;
   c) an AC bus connecting said AC voltage source to said AC terminals;
   d) thyristor means connected across said DC bus, said thyristor means acting, when conducting, to short circuit said DC current source, said thyristor means being rendered conducting by the application thereto of a gating signal and being rendered non-conducting by the reducing of current therethrough to substantially zero value;
   e) control means for selectively furnishing gating signals:
      1) to said switch devices in a prescribed sequence thereby rendering said devices selectively conducting to establish an electrical current to thus transfer electrical power between said DC current source and said AC voltage source, said electrical current being at a fundamental frequency corresponding to the frequency of said AC voltage source;

2) to said thyristor means to render said thyristor means conducting ad hence short circuit said DC current source; and, 3) to said switch devices to render said devices selectively conducting as a function of dextant values of the several phase voltages of said AC voltage source to render said thyristor means non-conducting and thus establish a conduction period for said thyristor means;

f) said control means including means to sense voltage values of said AC voltage source and further including means responsive to the sensed voltage values which latter means operates on the logic algorithm of:

1) if the line-to-line voltage of the pair of switch devices scheduled to be conducting in accordance with said prescribed sequence is negative, and there exists a sufficient safety angle to effect commutation of said thyristor means, render that pair conducting; if not, 2) select a pair of intermediate switch devices having a negative line-to-line voltage and a sufficient safety angle to effect commutation of said thyristor means, render that intermediate pair conducting and subsequently render conducting the switch devices then scheduled to be conducting while rendering non-conducting the intermediate pair of devices;

g) whereby the effective magnitude of the current between said DC current source and said AC voltage is varied as a function of the conducting period of said thyristor means.

3. The invention in accordance with claim 2 wherein the pair of intermediate switch devices selected is that pair having the most negative line-to-line voltage.

4. The invention in accordance with claim 3 wherein said control means further furnishes gating signals to then conducting switch devices to render such devices non-conducting at substantially the same time as the furnishing of gating signals to said thyristor means to render said thyristor conducting.

5. The invention in accordance with claim 2 wherein said control means further furnishes gating signals to then conducting switch devices to render such devices non-conducting at substantially the same time as the furnishing of gating signals to said thyristor means to render said thyristor conducting.

6. A power conversion scheme for selectively transferring electric power between a DC current source and an AC voltage source comprising:

a) plural switch devices arranged in a polyphase bridge circuit having DC terminals and AC terminals, each of said switch devices adapted to be selectively rendered conducting and non-conducting in response to applied gating signals;

b) a DC bus connecting said DC current source to said DC terminals;

c) an AC bus connecting said AC voltage source to said AC terminals;

d) thyristor means connected across said DC bus, said thyristor means acting, when conducting, to short circuit said DC current source, said thyristor means being rendered conducting by the application thereto of a gating signal and being rendered non-conducting by the reduction of current therethrough to substantially zero value;

e) control means for selectively furnishing gating signals;

1) to said switch devices in a prescribed sequence thereby rendering said devices selectively conducting to establish an electrical current to thus transfer electrical power between said DC current source and said AC voltage source, said electrical current being at a fundamental frequency corresponding to the frequency of said AC voltage source;

2) to said thyristor means to render said thyristor means conducting and hence short circuit said DC current source; and, 3) to said switch devices to render said devices selectively conducting as a function of extant values of the several phase voltages of said AC voltage source to render said thyristor means non-conducting and thus establish a conduction period for said thyristor means;

f) said control means including means to sense voltage values of said AC voltage source and further including means responsive to the sensed voltage values which latter means operates the logic algorithm of:

1) if the line-to-line voltage of the pair of switch devices scheduled to be rendered conducting in accordance with said prescribed sequence is negative, and there exits a sufficient safety angle to effect commutation of said thyristor means, render that pair conducting; if not, 2) if there exits a negative line-to-line voltage associated with a pair of switch devices, one of which is next scheduled to be rendered conducting, and there exists sufficient safety angle to effect commutation of said thyristor means, first render the last recited pair of devices conducting and after conduction is established therein transfer conduction to the scheduled pair of switch devices; if not, 3) select a pair of intermediate switch devices having a negative line-to-line voltage and a sufficient safety angle to effect commutation of said thyristor means, render that intermediate pair conducting, then render conducting the switch devices scheduled to be conducting while rendering non-conducting the intermediate pair of devices;

g) whereby the effective magnitude of the current between said DC current source and said AC voltage is varied as a function of the conducting period of said thyristor means.

7. The invention in accordance with claim 6 wherein said control means further furnishes gating signals to then conducting switch devices to render such devices non-conducting at substantially the same time as the furnishing of gating signals to said thyristor means to render said thyristor conducting.

8. The invention in accordance with claim 6 wherein the pair of intermediate switch devices selected is that pair having the most negative line-to-line voltage.

9. The invention in accordance with claim 8 wherein said control means further furnishes gating signals to then conducting switch devices to render such devices non-conducting at substantially the same time as the furnishing of gating signals to said thyristor means to render said thyristor conducting.

* * * * *